United States Patent [19]
Durina

[11] Patent Number: 5,188,399
[45] Date of Patent: Feb. 23, 1993

[54] PIPE COUPLING DEVICE AND METHOD
[75] Inventor: Michael F. Durina, Poland, Ohio
[73] Assignee: Spirex Corporation, Younstown, Ohio
[21] Appl. No.: 636,234
[22] Filed: Dec. 31, 1990
[51] Int. Cl.⁵ ............................................. F16L 21/08
[52] U.S. Cl. ..................................... 285/91; 285/177; 285/309; 285/330; 285/401; 285/402; 403/319; 403/348; 403/349
[58] Field of Search ............... 285/330, 177, 392, 91, 285/32, 401, 402, 309; 403/296, 348, 349, 315, 319; 138/44

[56] References Cited
U.S. PATENT DOCUMENTS

| Re. 27,156 | 7/1971 | Hedgewick | 215/222 |
| 744,788 | 2/1903 | Noble et al. | 285/330 |
| 939,436 | 11/1909 | McVoy | 285/330 |
| 967,395 | 8/1910 | Langhaar | 285/330 |
| 1,079,681 | 11/1913 | Winroath | 138/44 X |
| 1,233,750 | 7/1917 | Butcher | 220/293 X |
| 2,508,237 | 5/1950 | Eserkaln | 403/315 |
| 2,535,311 | 12/1950 | McGann | 285/402 X |
| 3,072,276 | 1/1963 | Nichols | 215/9 |
| 3,514,003 | 5/1970 | Fitzgerald | 215/9 |
| 4,119,232 | 10/1978 | Thornton | 215/222 |
| 4,126,338 | 11/1978 | Coel et al. | 285/392 |
| 4,128,184 | 12/1978 | Northup | 215/222 |
| 4,280,723 | 7/1981 | Moldestad | 285/402 X |
| 4,361,353 | 11/1982 | Vinson | 285/401 X |
| 4,434,903 | 3/1984 | Cooke | 215/222 |
| 4,512,484 | 4/1985 | Mar | 215/221 |
| 4,627,547 | 12/1986 | Cooke | 215/222 |
| 4,739,890 | 4/1988 | Cooke | 215/222 |
| 4,943,182 | 7/1990 | Hoblingre | 403/349 |

Primary Examiner—Randolph A. Reese
Assistant Examiner—Heather Chun
Attorney, Agent, or Firm—Buchanan Ingersoll; Alvin E. Ring

[57] ABSTRACT

A pipe coupling device wherein the connection between pipe members is made by rotating one member relative to the other member so that a plurality of radially extending surfaces of one member face corresponding radially extending surfaces of the other member. The facing surfaces can be flat and planar. The plurality of facing flat surfaces initially face each other in an interlocking arrangement which is not tight. A single threaded adapter is then tightened to draw the plurality of facing surfaces of one member tightly against the corresponding facing surfaces of the other member.

9 Claims, 3 Drawing Sheets

PIPE COUPLING DEVICE AND METHOD

BACKGROUND OF THE INVENTION

This invention relates to an interlocking pipe coupling device and method providing for rapid assembly and disassembly of a pressurized cylindrical pipe or barrel. This invention can be applied to a plasticating extruder or injection barrel having a barrel head which must be removed on occasion to facilitate removal of the extruder screw and to clean the barrel. Rapid removal of the barrel head is desirable to reduce maintenance time and machine down time. At present, the head is assembled to the barrel by means of a flange having a plurality of bolts which must be installed by torquing down each bolt and subsequently removed conversely. In place of a flange, this invention provides an interlocking coupling device able to withstand high axial shear forces by employing a single screw adapter to accomplish fastening and unfastening in place of multiple bolts.

DESCRIPTION OF RELATED ART

U.S. Pat. No. 1,233,750 to Butcher shows a hose coupling device wherein two sections of the coupling device are connected by rotating an inclined face on a lug on one member over a hemispherically shaped projection on a lug of another member so that the inclined face of the lug of the one member rides up over the hemispherically shaped projection of the lug of the other member to forcibly draw the coupling members together. In this device, complementary curved planes are required to accomplish the tightening together of the members.

SUMMARY OF THE INVENTION

The present invention comprises a pipe coupling device comprising pipe members each having interlocking means and a screw adapter threaded into the end of one of the pipe members remote from the other pipe member. The connection between pipe members is made by rotating one member relative to the other member so that a plurality of radially extending surfaces of one member face corresponding radially extending surfaces of the other member, where the facing surfaces do not ride up over one another or otherwise obstruct rotary movement of one another. The facing surfaces can be flat and planar. The plurality of corresponding flat surfaces initially face each other in an interlocking relationship which is not tight. Thereupon, a single threaded adapter is tightened into the end of said one member which is remote from said other member to draw all of the facing surfaces on one member tightly against the corresponding facing surfaces of the other member so that the pairs of facing surfaces contact each other on a common flat plane.

The device of this invention forms a tight joint by forcing together a multiplicity of surfaces which can touch on a single flat plane. The difficulty of machining complementary curved surfaces is avoided. When the contacting surfaces are flat, there is no room for entrapping an air pocket between them, as could occur between contacting curved surfaces which were not machined exactly complementary to each other.

In contrast to a flange connection having a plurality of bolts that must be individually tightened and untightened to accomplish connecting and disconnecting, the device of this invention employs a single screw adapter or externally threaded pipe to accomplish a tight connection on a plurality of contact surfaces, and the contacting force on all the surfaces can be substantially equal.

DESCRIPTION OF PREFERRED EMBODIMENTS

Figures 1, 2:
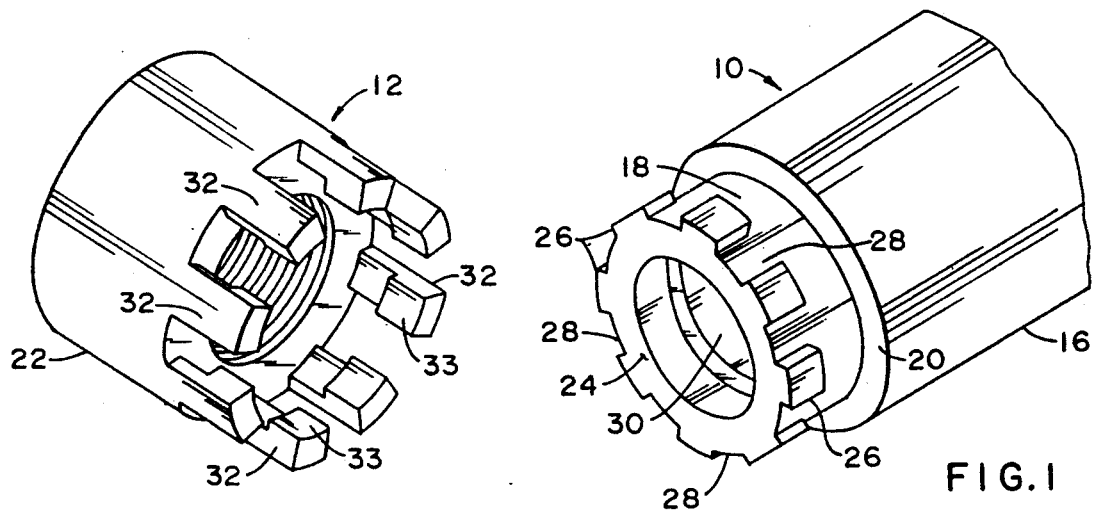
FIG. 1 is an isometric view of the discharge end of a plasticating barrel modified to receive an insert element.
FIG. 2 is an isometric view showing the mating insert element for the barrel of FIG. 1.
Figure 3:
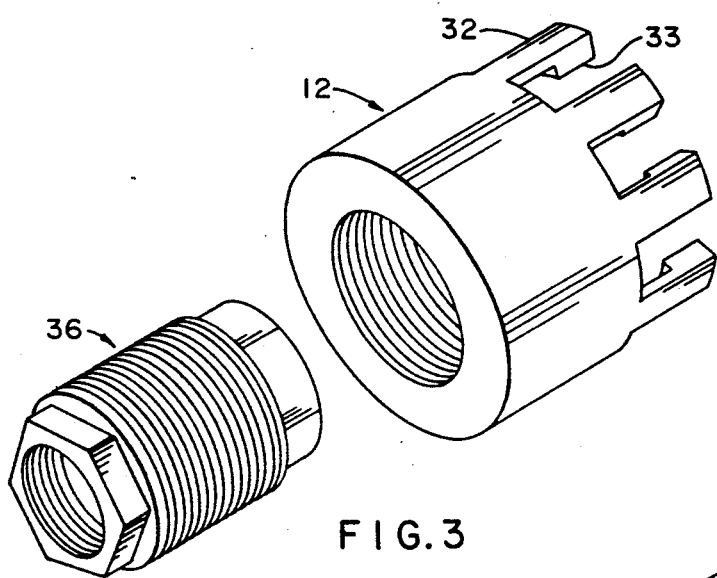
FIG. 3 is an isometric view showing the insert element and an associated adapter.

Referring to FIGS. 1, 2 and 3, 10 indicates a cylindrical plasticating barrel, 12 indicates a cylindrical insert element and 36 indicates an adapter. Barrel 10 has outer cylindrical shell 16 and a recessed cylindrical shell 18 removed from outer shell 16 by radial ledge 20. Insert element 12 has cylindrical outer shell 22 having the same diameter as outer shell 16. Of course, the diameters of two joining pipes can be different, if desired. Recessed shell 18 at terminal end 24 of barrel 10 is provided with circumferentially spaced-apart radial cogs 26 which form a series of circumferentially spaced-apart alternating cogs 26 and intervening notches 28. Interior 30 of barrel 10 can comprise a plasticating chamber provided with a plasticating screw, not shown. A plasticating chamber and screw apparatus is shown in U.S. Pat. No. 4,752,136, which is hereby incorporated by reference.

Figure 4:
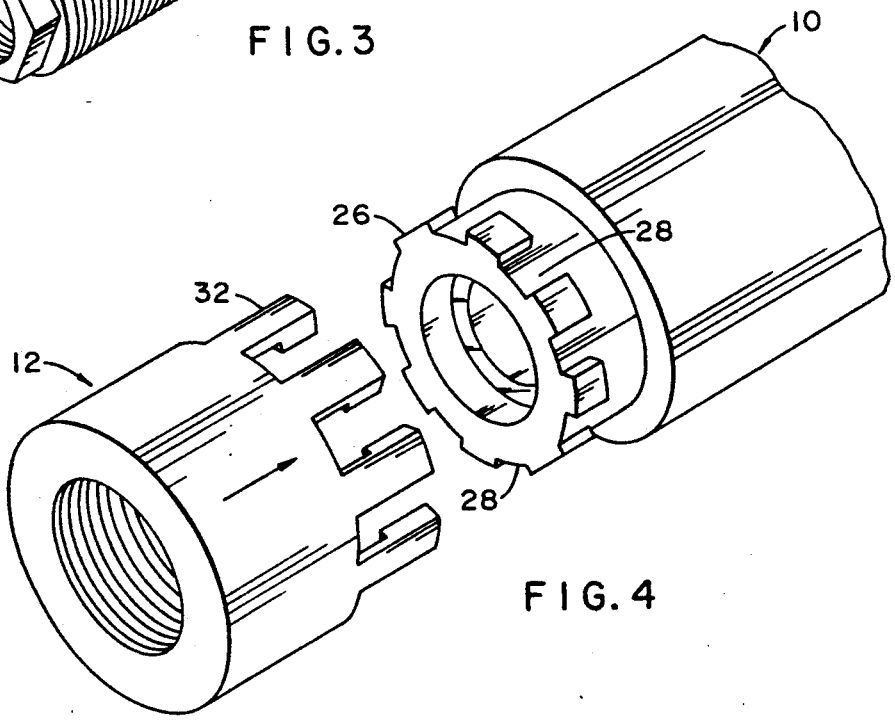
FIGS. 4, 5 and 6 are isometric views illustrating the sequence of assembly steps for the barrel cap coupling elements.
Figure 5:
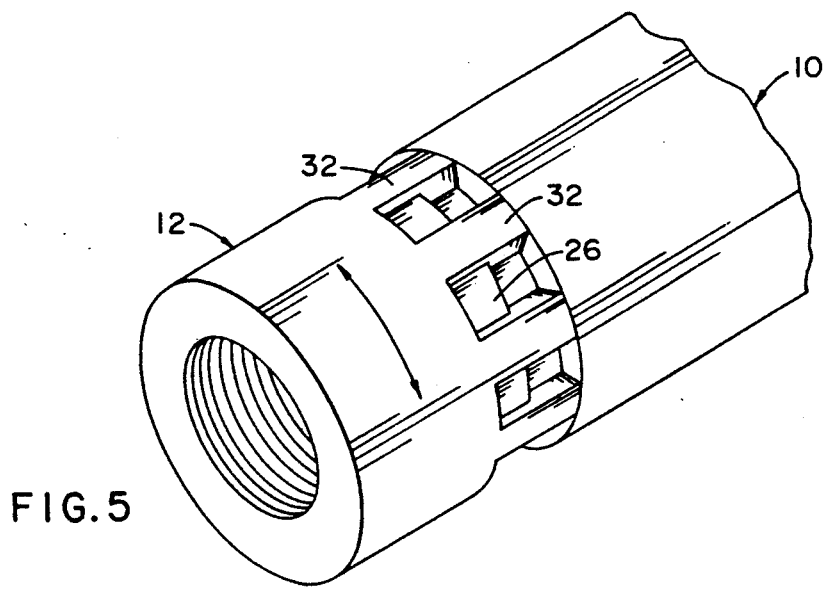

Insert element 12 is provided with a plurality of circumferentially spaced-apart forwardly protecting arms 32. The terminus of each arm 32 comprises an elbow which forms a radially inturned arm 33. The distance between arms 32 is established so that each arm 32 can be inserted into a corresponding notch 28, as indicated in FIG. 4, and so that barrel 10 and insert element 12 can form a continuous pipe of uniform outside diameter, as shown in FIG. 5. As noted above, the diameters of the barrel and insert element can be different. In that case, a continuous pipe of non-uniform diameter will be formed. Insert element 12 is then rotated relative to barrel 10 so each that that each projecting arm 32 overlies a corresponding cog 26, as shown in FIG. 6.

Figure 6:
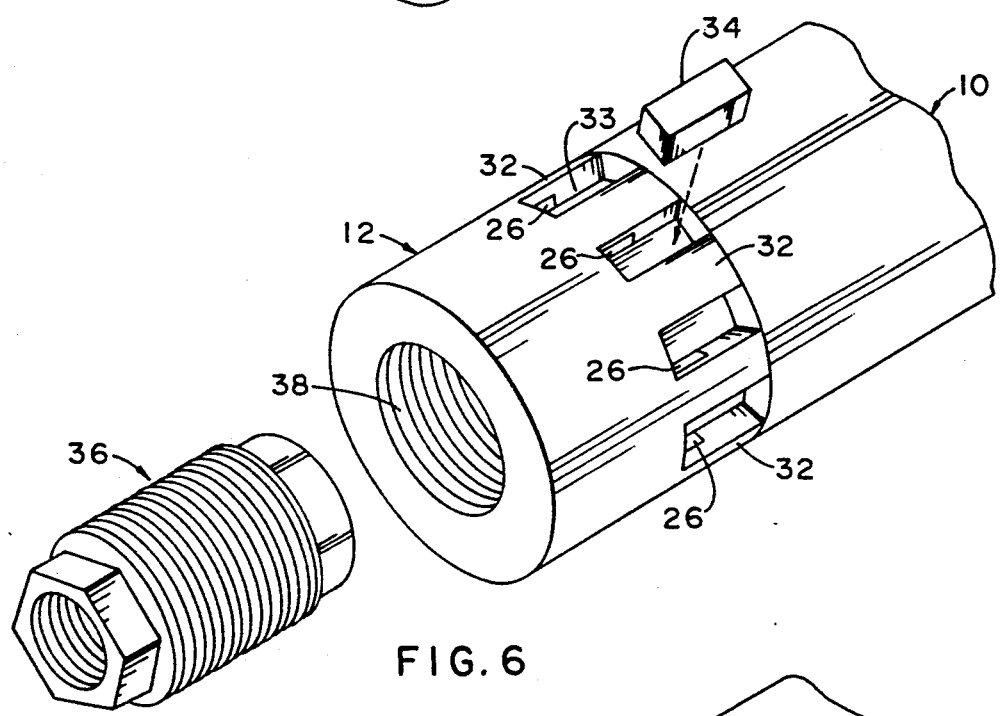
Figure 7:
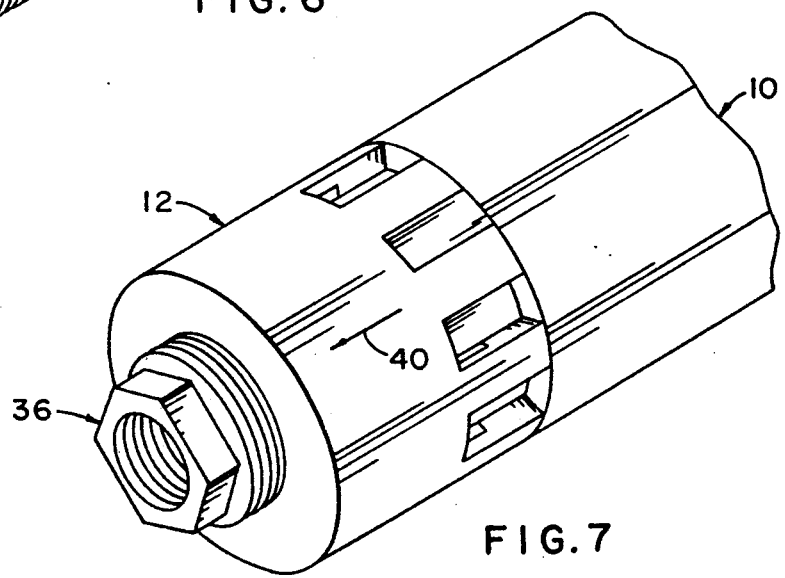
FIG. 7 is an isometric view showing the barrel cap elements completely assembled.

When projecting arms 32 overlie corresponding cogs 26, anti-rotational insert locking plug 34 is inserted into any notch 26, as shown in FIG. 6, to prevent further rotation or counter rotation of insert element 12 relative to barrel 10. Thereupon, screw adapter 36 having external threads is inserted into threaded interior 38 of insert element 12 while preventing rotation of the unitized assembly of insert element 12 and barrel 10 by any suitable holding or mounting means. Rotation of adapter 36 into insert element 12 while restraining barrel 10 against rotation by any suitable holding means for barrel 10, not shown, exerts a longitudinal force on insert element 12 tending to pull element 12 axially in the direction indicated by arrow 40 in FIG. 7. Screw adapter 36 can be an externally threaded pipe in which case it can serve as an internal pipe for the joined apparatus. When the interior of screw adapter 36 is threaded, as shown, it can receive another interior pipe of smaller diameter which has exterior threads but which need not be threaded on its interior surface. It will be appreciated that the tightening effect of the screw adapter on the joined elements will occur no matter whether the adapter is screwed into the end of insert element 12, as shown, or if the interior of barrel 10 is provided with threads and the adapter is similarly screwed into the interior of barrel 10 at the opposite end of barrel 10.

Figure 8:
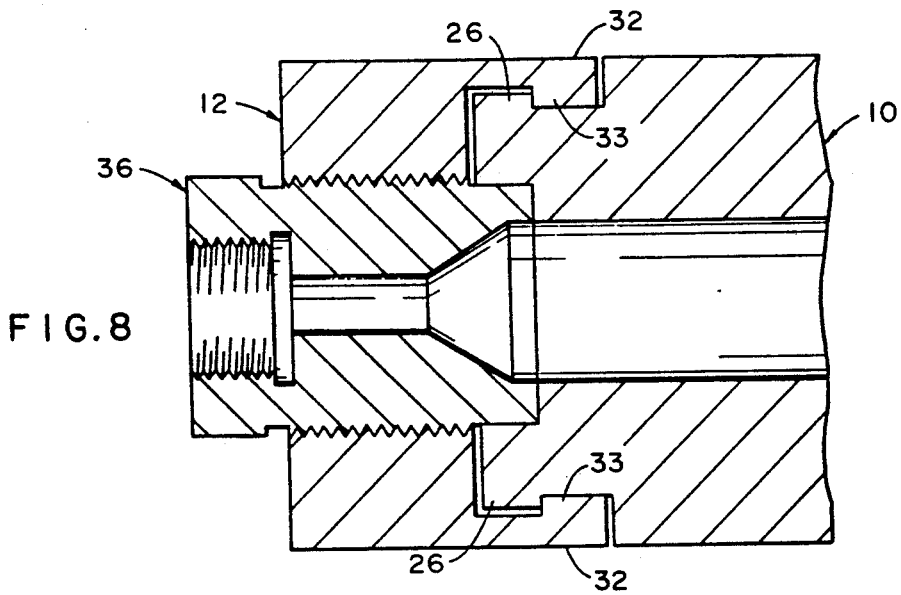
FIG. 8 is a cross-section view of the assembled barrel cap elements.
Figure 9:
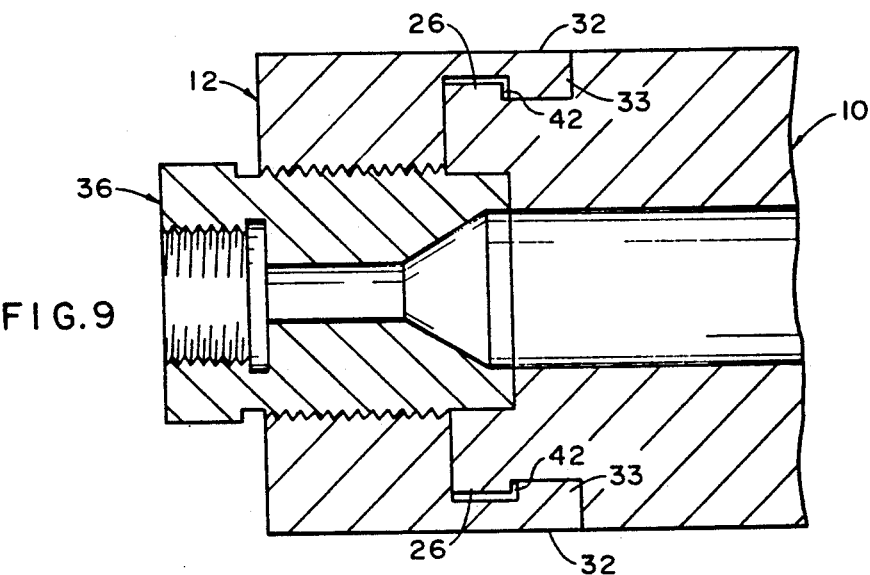
FIG. 9 is another cross-sectional view of the assembled barrel cap elements.
Figure 10:
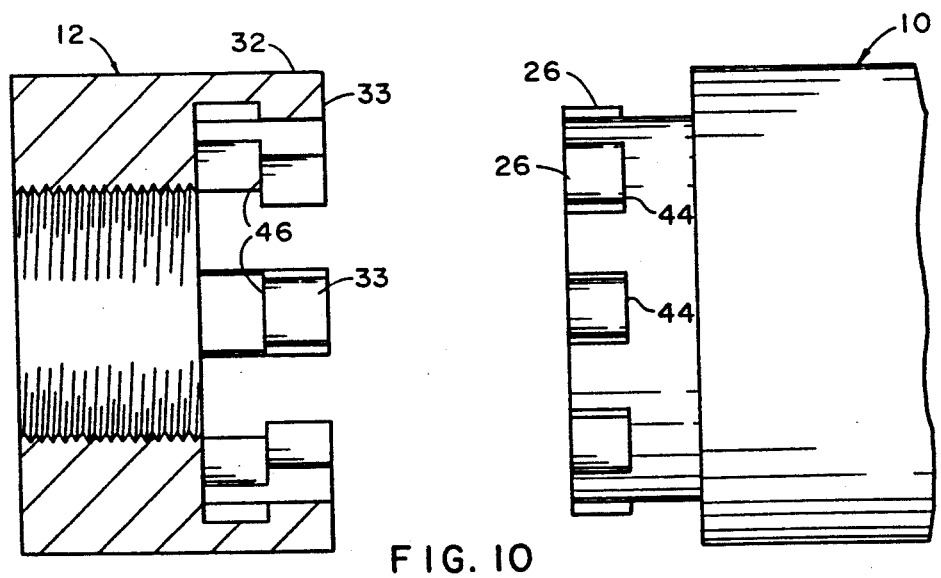
FIG. 10 illustrates the flat or level planar configuration of the radial facing surfaces which are forced together.

The significance of this axial pulling effect will become apparent by referring to FIGS. 8, 9 and 10. FIG. 9 shows the position of insert element 12 relative to barrel 10 before the longitudinal pulling step. FIG. 8 shows the position of insert element 12 relative to barrel 10 after the pulling step. Referring to FIG. 9, there is a clearance space 42 between the radial facing surfaces of each inturned arm 33 and its corresponding cog 26 before adapter 36 is screwed tightly into insert element 12. Clearance space 42 can be very small and is equivalent to a loose contact between the facing surfaces as long as friction between the surfaces is low enough to permit substantially unhindered rotation of insert element 12 relative to barrel 10 as indicated by the arrows in FIG. 5. Thereupon, rotation of adapter 36 while restraining the other elements of the assembly against rotation will pull the facing surface of each inturned arm 33 and complementary cog 26 together into a friction-tight enclosing joint thereby eliminating space 42, as is shown in FIG. 8. Rotation of single adapter screw 36 thereby forces tight contact between a plurality of pairs of radial surfaces lying on a common plane.

In order to facilitate relatively frictionless rotation of insert element 12 relative to barrel 10 in the rotary motion illustrated in FIG. 5 the facing surfaces of cog 26 and inturned arm 33 are each advantageously flat. This is illustrated in FIG. 10, where each facing surface 44 of cogs 26 is shown to be flat and planar and where each facing surface 46 of inturned arms 33 is also shown to be flat and planar. When insert element 12 is assembled with barrel 10, flat planar surfaces 44 and 46 face each other across space 42, as shown in FIG. 9, and abut against each other after tightening of adapter 36, as shown in FIG. 8.

The joint shown in FIG. 8 can be rapidly disengaged by loosening screw adapter 36, permitting space 42 to form, then removing locking plug 34. Insert element 12 can then be removed from barrel 10 by rotating element 12 as shown in FIG. 5 and then removing insert element 12 from barrel 10 by reversing the direction of movement indicated by the longitudinal arrow shown in FIG. 4.

I claim:

1. A detachable assembly comprising a barrel having a cylindrical outer shell, a cylindrical inset element and an externally threaded adapter, said barrel having an outer surface at one end provided with circumferentially spaced-apart radial cogs forming a series of alternating cogs and notches, said insert element having a plurality of circumferentially spaced apart forwardly projecting arms, the terminus of said projecting arms comprising an elbow forming an inturned arm, said projecting arms positioned circumferentially relative to said notches so that said projecting arms can be inserted into said notches, said inturned arms positioned relative to said cogs so that after insertion of said projecting arms into said notches said inset element can be rotated relative to said barrel so that said inturned arms face said cogs along facing radial surfaces on said cogs and inturned arms respectively, said adapter screwed into said insert element at the internally threaded end of said inset element remote from said barrel so that the facing surfaces of said inturned arms are drawn tightly against the corresponding facing surfaces of said cog.

2. The assembly of claim 1 wherein the radial facing surfaces of said inturned arms and the radial facing surfaces of said cogs are each flat.

3. The assembly of claim 1 including a locking member inserted in a notch.

4. The assembly of claim 1 wherein said cogs are disposed on a recessed shell of said barrel separated from the outer shell of said barrel by a radial ledge.

5. The assembly of claim 1 wherein the barrel comprises a plasticating chamber.

6. The pipe coupling device of claim 1 wherein the interlocking pipe member comprises a plasticating or extruder injection barrel.

7. The pipe coupling device of claim 1 adapted to withstand high shear forces.

8. A method for forming a joint between a cylindrical barrel and a cylindrical insert element with an externally threaded adapter threaded into the internally threaded end of said inset element remote from said barrel, said barrel having an outer surface at one end provided with circumferentially spaced-apart radial cogs forming a series of alternating cogs and notches, said insert element having a plurality of circumferentially spaced apart forwardly projecting arms with the terminus of each of said arms comprising an elbow forming a radially inturned arm, said method comprising longitudinally injecting said projecting arms into said notches, rotating said insert element until a radial surface on each of said inturned arms faces a corresponding radial surface on each of said cogs, locking said insert element against further rotation relative to said barrel, rotating said adapter into said insert element to draw said radial facing surfaces of said inturned arms against said radial facing surfaces of said cog.

9. The method of claim 8 including releasing said joint by rotating said adapter in a reverse direction to loosen said joint, unlocking said insert element against rotation relative to said barrel, rotating said insert element until said surfaces of said inturned arms and said surfaces of said cogs no longer face each other, and withdrawing said projecting arms from said notches.

* * * * *